Oct. 24, 1933.  E. H. KENDALL  1,932,219
UNITARY BRAKE
Filed Feb. 28, 1931   3 Sheets-Sheet 1
Fig. 1
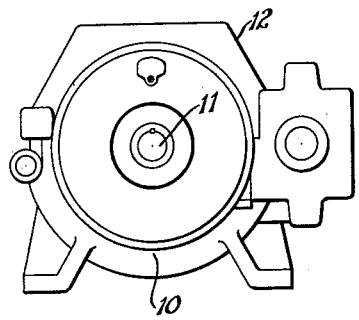
Fig. 2
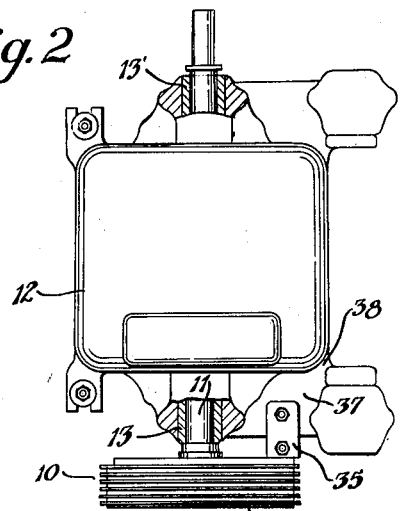
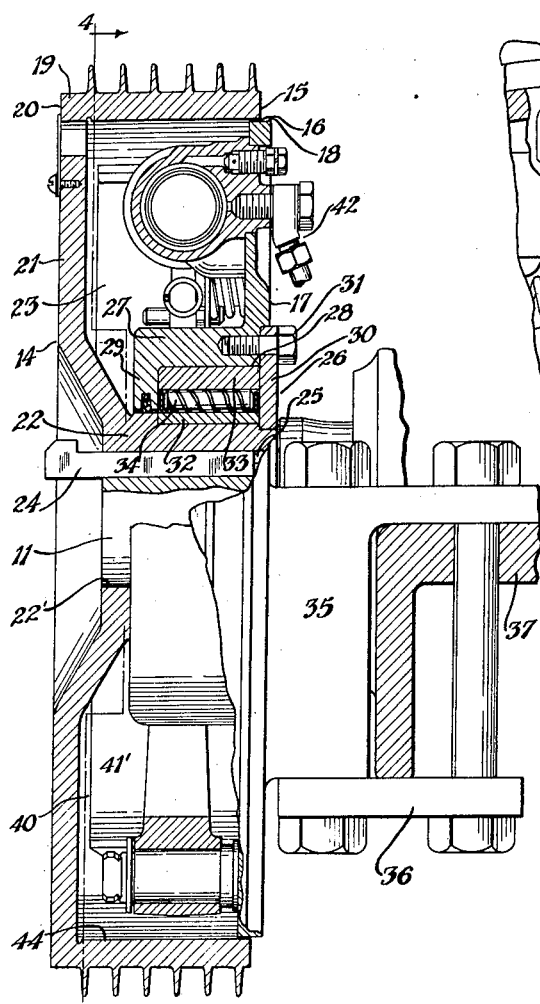
Fig. 3
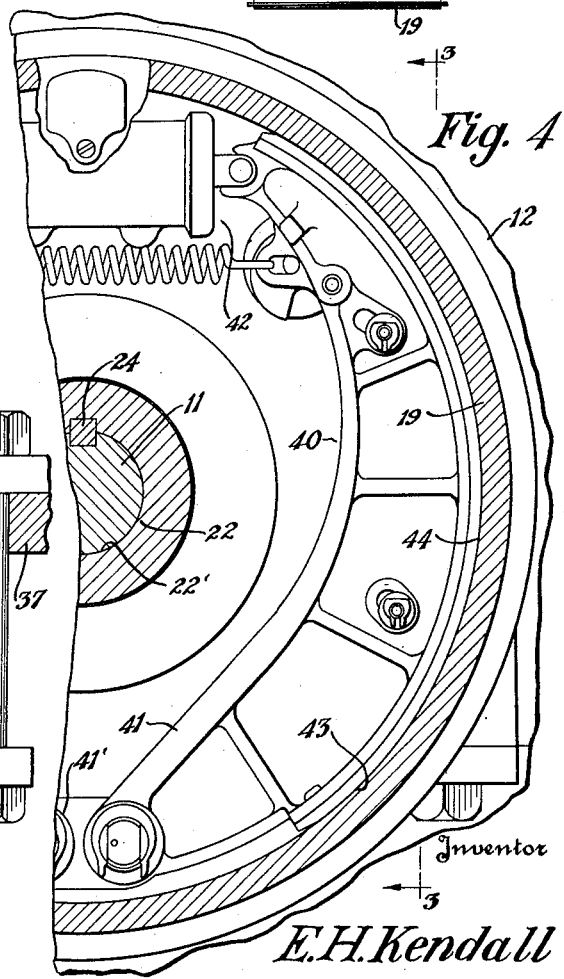
Fig. 4
Inventor
E. H. Kendall
By Frease and Bishop
Attorneys Oct. 24, 1933.  E. H. KENDALL  1,932,219
UNITARY BRAKE
Filed Feb. 28, 1931   3 Sheets-Sheet 2
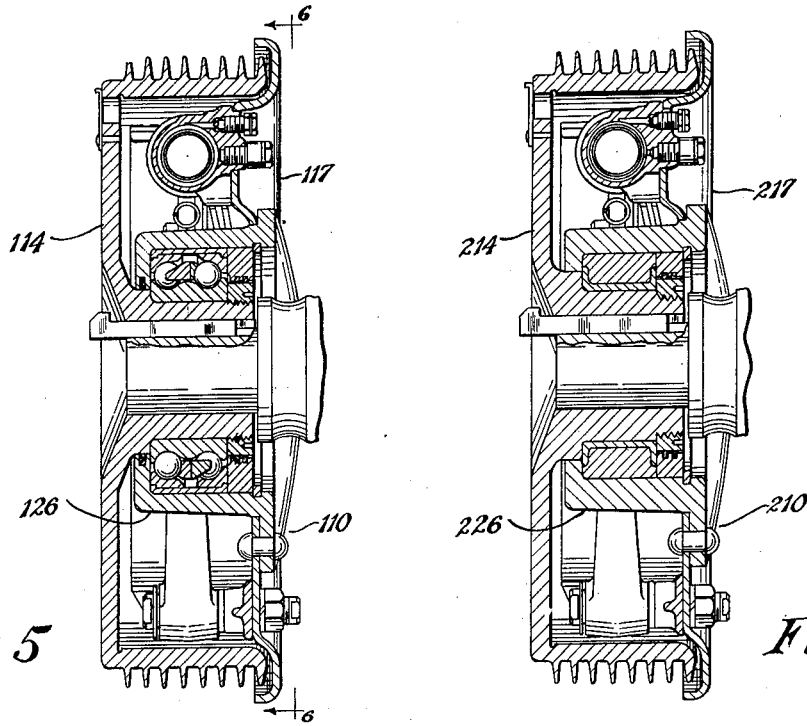
Fig. 5
Fig. 7
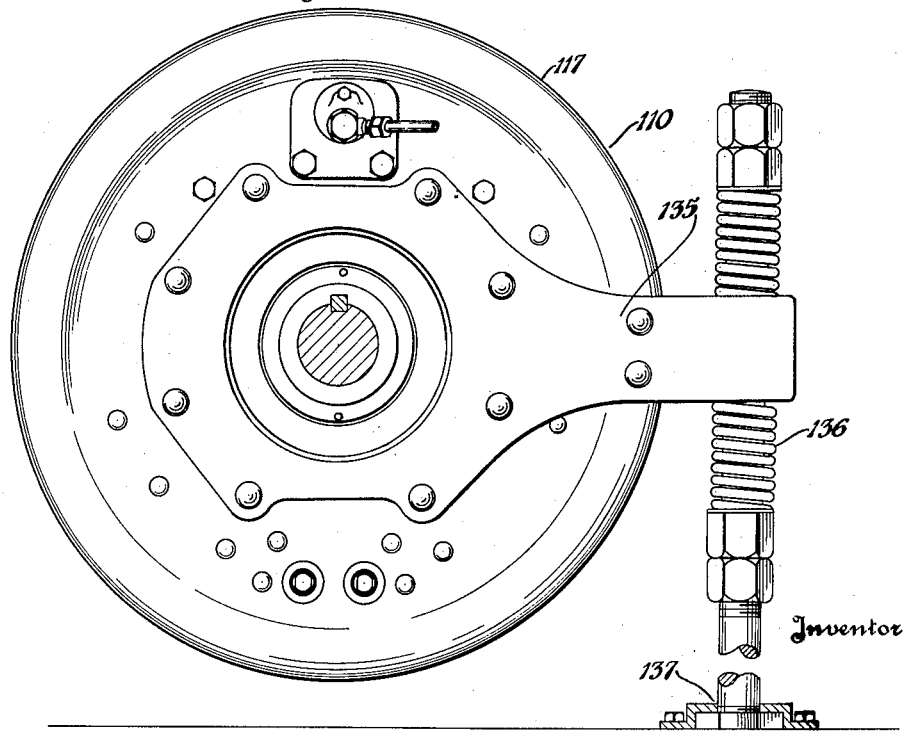
Fig. 6
Inventor
E. H. Kendall
By Frease and Bishop
Attorneys

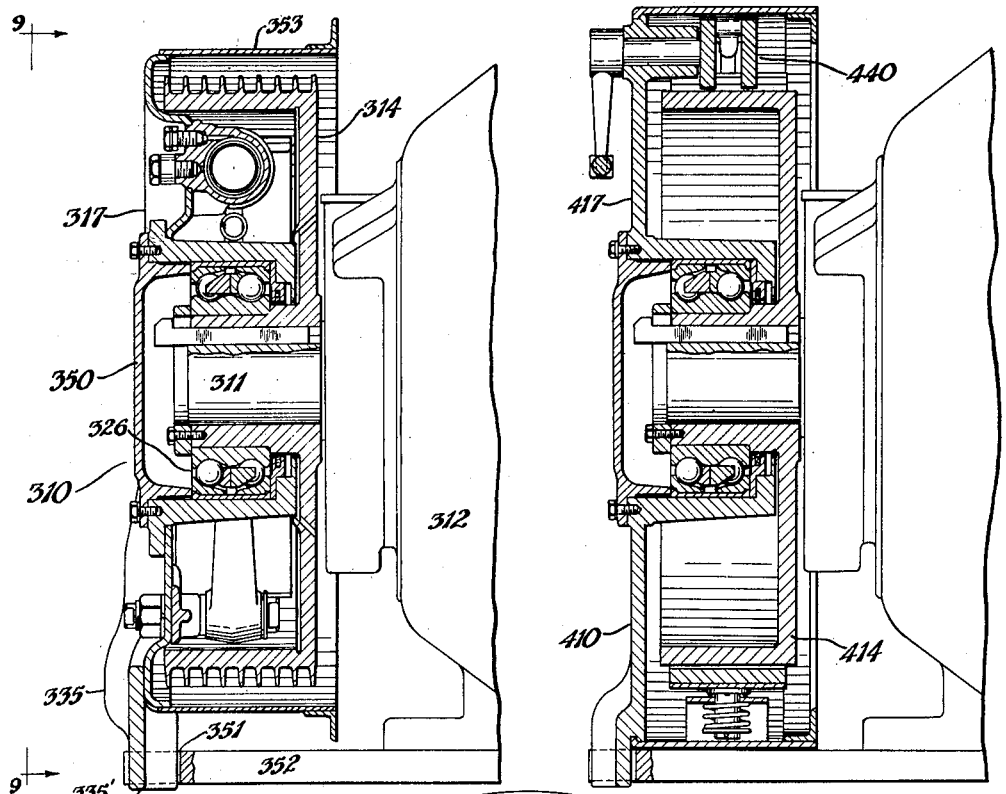
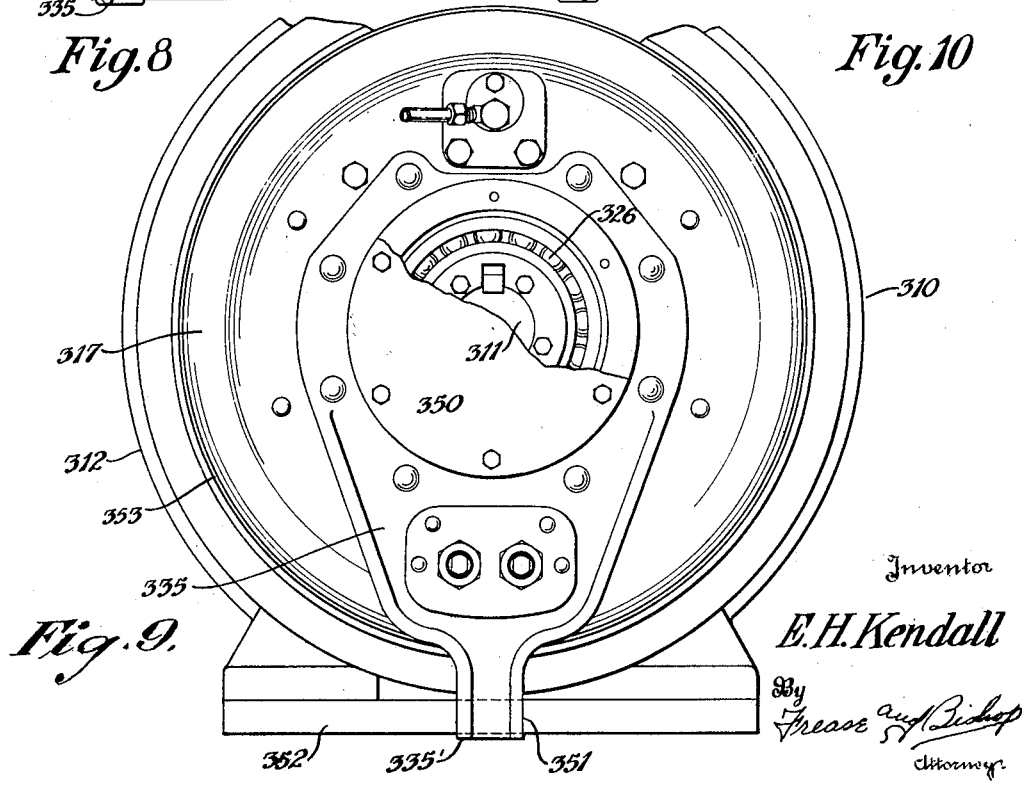
Fig. 8  Fig. 10  Fig. 9

Patented Oct. 24, 1933

1,932,219

UNITED STATES PATENT OFFICE 1,932,219

UNITARY BRAKE

Edgar Homer Kendall, Alliance, Ohio

Application February 28, 1931. Serial No. 518,924

6 Claims. (Cl. 188—78)

My invention relates to apparatus including two members rotatable with respect to each other, and engaging means operatively mounted on one member for selective engagement with the other member, and one of the members being secured on a third rotating member, such as a shaft.

Such apparatus may include brakes, clutches, ratchet devices and the like, and in order to insure uniform successive operations of such apparatus it is essential that the members arranged for selective engagement with each other be maintained concentric with each other and with the shaft.

On the other hand, in order to attain ease of assembly maintenance, and interchangeability, it is very desirable that such apparatus should be unitary and adapted for bodily movement to and from a shaft, and for interchangeable use on any shaft having the proper diameter without disturbing the adjustment of the operating parts of the apparatus, such as the brake shoes and drum of an internal brake, for which the present improvements are particularly adapted.

Heretofore, brakes for the heavier classes of industrial machinery, such as traveling cranes and the electric motors therefor, have usually been of the external type of friction brake, and have required frames or mountings separate from the shaft or motor mountings, thus increasing the bulk and complexity of the complete machine.

Moreover, most heavy duty electric motors are and have been supplied with babbit bearings which wear quickly and throw the motor shaft out of its initial position of alinement.

Only the external type of brake has heretofore been suitable for use with such motor shafts, for the reason that external brakes do not require close adjustment of the operating parts.

On the other hand internal brakes are now generally conceded to be superior to external brakes, excepting that internal brakes require very close adjustment of the operating parts.

The objects of the present improvements include the provision of unitary apparatus for use as a brake or the like for a rotating member such as a shaft, and the unitary apparatus including operative parts which may be maintained in relatively close adjustment regardless of the changes in the alinement of the shaft upon which the unitary apparatus is applied, and the unitary apparatus being further adapted for interchangeable mounting on any of a plurality of shafts, without disturbing the adjustment of the operating parts of the apparatus.

The foregoing and other objects are attained by the apparatus, parts, improvements, and combinations, which comprise the present invention and which are particularly and distinctly pointed out and set forth in the appended claims forming part hereof.

In general terms the improved unitary apparatus may be described as including two members movable with respect to each other, one of the members preferably being a housing member and having a cylindrical opening at one end thereof, and the other member providing a circular closure for the opening. Preferably anti-friction bearing means rotatably mount one of the members on the other member. Within the housing member are preferably located engaging means, which may be the usual brake shoes and operating mechanism of an internal brake, and the engaging means are operatively mounted on one of the members for selective engagement with the other member. One of the membrs is adapted for being secured on a shaft as by means of a key, and the other member is adapted for being maintained normally stationary in the brake form of the apparatus.

Preferred embodiments of the improved apparatus in the form of unitary brakes, are illustrated in the accompanying drawings forming part hereof, in which Figure 1 is an end elevation illustrating one of the improved unitary brakes applied to a heavy duty electric motor;

Fig. 2, a fragmentary plan view thereof;

Fig. 3, an enlarged fragmentary view looking in the direction of the arrows 3—3, Fig. 4, with portions illustrated in vertical section;

Fig. 4, a fragmentary sectional view thereof as on line 4—4, Fig. 3;

Fig. 5, a view similar to Fig. 3, illustrating a second embodiment of the improvements;

Fig. 6, a sectional view thereof as on line 6—6, Fig. 5;

Fig. 7, a view similar to Figs. 3 and 5, illustrating a third embodiment of the improvements;

Fig. 8, a view similar to Figs. 3, 5, and 7, illustrating a fourth embodiment of the improvements;

Fig. 9, an end view thereof, looking in the direction of the arrows 9—9, Fig. 8; and Fig. 10, a view similar to Figs. 3, 5, 7, and 8, illustrating a fifth embodiment of the improvements.

Similar numerals refer to similar parts throughout the several views.

One embodiment of the invention comprises a unitary brake indicated generally at 10 and illustrated in Figs. 1 to 4 inclusive, in which the brake 10 is applied to one end of the rotor shaft 11 of a heavy duty electric motor 12.

The motor 12 in accordance with the usual practice, includes Babbitt bearings 13 and 13' in which the rotor shaft 11 is journalled. These usual Babbitt bearings wear rapidly in a heavy duty motor, but such wear has no effect on the operation of the improved unitary brake 10 which is removably applied directly on one end of the shaft 11.

The unitary brake 10 includes a housing member indicated generally by 14, and one end 15 of the housing member 14 is provided with a cylindric opening 16 in which is located a closure member 17 having a cylindric periphery 18 rotatably fitting within the opening 16.

The housing member 14 may be in the form of an integral casting as shown, and includes a cylindric wall 19 extending from the open end 15 to a junction at the other end 20 with the outer periphery of a preferably integral circular end wall 21, and a hub 22 extends from the central portions of the circular end wall 21 in the same direction as the outer cylindric wall 19 towards the closure member 17 forming an annular chamber 23 within the housing member 14.

Accessible means are provided for detachably securing the unitary brake 10 on the shaft 11, and as illustrated for this purpose, the hub 22 is provided with a bore 22' for fitting on the shaft 11, and the housing member 14 is secured to the shaft 11 as by means of a key 24 fitting in registering keyways indicated generally by 25 formed in the opposed surfaces of the shaft 11 and hub 22.

The closure member 17 is rotatably mounted on the hub 22 preferably by means of the anti-friction bearing mounting indicated generally by 26.

The bearing mounting 26 preferably includes a cylindric sleeve 27 extending within the annular chamber 23 from a central circular opening 28 provided in the closure member 17.

A peripheral clamping and sealing flange 29 extends from the sleeve 27 within the chamber 23 towards the hub 22, and a clamping and sealing ring plate 30 is removably secured on the outer face of the closure member 17 as by means of cap screws 31.

An inner raceway member 32 is seated on the outer surfaces of the hub 22, and an outer raceway member 33 is seated in the sleeve 27 between the flange 28 and plate 30, and anti-friction rolls 34 are interposed between and roll on the outer and inner surfaces respectively of the inner raceway member 32 and the outer raceway member 33.

The closure member 17 is maintained normally stationary, as by means of a lug 35 extending therefrom and secured as by means of a bolt clamp 36 to projecting portions 37 of the frame 38 of the motor 12.

Within the chamber 23 of the housing member 14, engaging means indicated generally by 40 are operatively mounted preferably on the normally stationary closure member 17, and the engaging means as illustrated are usual internal brake shoes 41 and 41', associated with a usual hydraulic control mechanism indicated generally by 42, whereby the outer cylindric surface 43 of each brake shoe may be selectively engaged with the inner cylindric surface 44 of the rotating housing member 14.

The hydraulic control mechanism 42 is shown only in part and is of any usual design.

It is obvious that any usual mechanical control means similar to that indicated in Fig. 10 may be substituted for the hydraulic control means for operating the brake shoes 41 and 41'.

The second embodiment of the improvements comprises a unitary brake indicated generally by 110 in Figs. 5 and 6, and is generally similar to the brake 10, but includes ball bearing mounting means 126 for the housing member 114 and closure member 117.

The means for maintaining the closure member 117 normally stationary includes an arm 135 riveted on the back of the closure member 117 and extending outwardly at one side thereof, and the end of the arm 135 is yieldingly engaged as by means of a double spring tie clamp 136, one end of which is secured to the floor as at 137.

The third embodiment of the improvements 210 illustrated in Fig. 7, is generally similar to the embodiments 10 and 110, but includes a plain bearing mounting 226 rotatably mounting the housing member 214 and closure member 217 for coaxial rotation with respect to each other.

In Figs. 8 and 9 a fourth embodiment of the improvements in the form of a unitary brake is indicated generally by 310, which differs primarily from the first, second and third embodiments in that the brake 310 is applied to one end of the rotor shaft 311 of a heavy duty electric motor 312, so that the housing member 314 of the brake 310 is secured on the shaft 311 directly adjacent the motor, and the normally stationary closure member 317 of the brake is located on the outer end thereof when installed.

A secondary closure member 350 is applied to the closure and brake shoe mounting member 317 centrally thereof, as illustrated, in order that access may be had to the bearing 326 for the brake 310, without removing the brake from the rotor shaft 311.

The brake 310 also includes means for maintaining the closure member 317 normally stationary, which, as illustrated, includes an arm 335 riveted to the outside of the closure member 317, and extending downwardly therefrom, and the outer extremity 335' of the arm 335 fits in a notch 351 which may be formed in the base plate 352 on which the motor 312 is secured.

A cylindric guard member 353 may be secured at one end to the outer periphery of the closure member 317, as illustrated, and extends therefrom over the rotating housing member 314 thereby attaining a high degree of safety for the unitary brake 310.

The fifth embodiment of the improvements indicated generally by 410 in Fig. 10, is generally similar to the embodiment 310, but illustrates an external mechanical brake mechanism indicated generally by 440 and operatively mounted on the normally stationary brake member 417 for selective engagement against the outer cylindric surface of the rotating brake member 414.

I claim:

1. Unitary brake apparatus and the like including two members, means rotatably mounting one member on the other member, and engaging means operatively mounted on one member for selective engagement with the other member, and accessible means for detachably securing the unitary apparatus on a shaft, whereby the unitary apparatus may be bodily mounted on or removed from the shaft without disassembling the two members and the rotatable mounting means and the engaging means interposed therebetween.

2. In combination, a shaft, unitary engaging apparatus, and means detachably securing the unitary engaging apparatus on the shaft, the unitary engaging apparatus including two members, means rotatably mounting one member on the other member, and engaging means operatively mounted on one member for selective engagement with the other member, and one of the members being shaped with an opening permitting direct access to the securing means whereby the unitary apparatus is bodily mounted on the shaft and may be removed therefrom without disassembling the two members and the rotatable mounting means and the engaging means interposed therebetween.

3. In combination, a shaft, unitary engaging apparatus, and means detachably securing the unitary engaging apparatus on the shaft, the unitary engaging apparatus including two members, means rotatably mounting one member on the other member, and engaging means operatively mounted on one member for selective engagement with the other member, and one of the members being shaped with an opening permitting direct access to the securing means whereby the unitary apparatus is bodily mounted on the shaft and may be removed therefrom without disassembling the two members and the rotatable mounting means and the engaging means interposed therebetween, and means maintaining the other member normally stationary.

4. Unitary brake apparatus and the like including two members, each of the members having a central opening formed therein, a hub extending from one of the members and having a bore communicating with the central opening thereof, a sleeve extending from the other member and having a bore communicating with the central opening thereof and being located about the hub, bearing means interposed between the hub and the sleeve and mounting the members for rotation with respect to each other, and engaging means operatively mounted on one member for selective engagement with the other member, and the hub being adapted for being separately secured on a shaft, whereby the unitary apparatus may be bodily mounted on or removed from the shaft without disassembling the two members and the bearing means and the engaging means interposed therebetween.

5. In combination, a shaft, unitary engaging apparatus, and means separably securing the unitary engaging apparatus on the shaft, the unitary engaging apparatus including two members, each of the members having a central opening formed therein, a hub extending from one of the members and having a bore communicating with the central opening thereof, a sleeve extending from the other member and having a bore communicating with the central opening thereof and being located about the hub, bearing means interposed between the hub and the sleeve and mounting the members for rotation with respect to each other, and engaging means operatively mounted on one member for selective engagement with the other member, and the hub cooperating with the securing means whereby the unitary apparatus is bodily mounted on the shaft and may be removed therefrom without disassembling the two members and the bearing means and the engaging means interposed therebetween.

6. Unitary brake apparatus and the like including a housing member having an opening at one end thereof, a closure member for the opening, means rotatably mounting one member on the other member, and engaging means located within the housing member and operatively mounted on one member for selective engagement with the other member, and accessible means for detachably securing the unitary apparatus on a shaft, whereby the unitary apparatus may be bodily mounted on or removed from the shaft without disassembling the two members and the rotatable mounting means and the engaging means interposed therebetween.

EDGAR HOMER KENDALL.